United States Patent
Debout et al.

(10) Patent No.: US 9,537,656 B2
(45) Date of Patent: Jan. 3, 2017

(54) SYSTEMS AND METHODS FOR MANAGING CRYPTOGRAPHIC KEYS IN A SECURE MICROCONTROLLER

(71) Applicant: Maxim Integrated Products, Inc., San Jose, CA (US)

(72) Inventors: Vincent Debout, La Ciotat (FR); Frank Lhermet, Roquevaire (FR); Yann Yves Rene Loisel, La Ciotat (FR); Gregory Rome, Aix en Provence (FR); Christophe Tremlet, Aubagne (FR)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/528,810

(22) Filed: Oct. 30, 2014

(65) Prior Publication Data

US 2016/0072628 A1    Mar. 10, 2016

Related U.S. Application Data

(62) Division of application No. 13/597,009, filed on Aug. 28, 2012, now Pat. No. 9,021,272.

(30) Foreign Application Priority Data

Sep. 15, 2011 (FR) ...................................... 12 53398
Apr. 13, 2012 (FR) ...................................... 11 58222

(51) Int. Cl.
*H04L 9/30* (2006.01)
*G06F 12/14* (2006.01)
(Continued)

(52) U.S. Cl.
CPC ......... *H04L 9/3073* (2013.01); *G06F 12/0246* (2013.01); *G06F 12/1408* (2013.01);
(Continued)

(58) Field of Classification Search
CPC .............................. G06F 3/0232; H04L 9/3073
See application file for complete search history.

(56) References Cited

U.S. PATENT DOCUMENTS 5,333,034 A    7/1994   Gu et al.
5,587,957 A    12/1996   Kowalczyk et al.
(Continued)

FOREIGN PATENT DOCUMENTS

EP        1978467 A1    10/2008
WO    02077878 A1    10/2002

OTHER PUBLICATIONS

Search Report dated May 6, 2014, in related French Application No. 1358884.

*Primary Examiner* — Josnel Jeudy
(74) *Attorney, Agent, or Firm* — North Weber & Baugh LLP

(57) ABSTRACT

The present invention relates to key management in a secure microcontroller, and more particularly, to systems, devices and methods of automatically and transparently employing logic or physical address based keys that may also be transferred using dedicated buses. A cryptographic engine translates a logic address to at least one physical address, and processes a corresponding data word based on at least one target key. The target key is selected from a plurality of keys based on the logic or physical address. A universal memory controller stores each processed data word in the corresponding physical address within a memory. Each key is associated with a memory region within the memory, and therefore, the logic or physical address associated with a memory region may be used to automatically identify the corresponding target key. A dedicated secure link may be used to transport key request commands and the plurality of keys.

16 Claims, 8 Drawing Sheets

(51) Int. Cl.
*G06F 21/79* (2013.01)
*G06F 21/72* (2013.01)
*G06F 12/02* (2006.01)
*H04L 9/08* (2006.01)

(52) U.S. Cl.
CPC .......... *G06F 12/1441* (2013.01); *G06F 21/72* (2013.01); *G06F 21/79* (2013.01); *H04L 9/0869* (2013.01); *H04L 9/0894* (2013.01)

(56) References Cited

U.S. PATENT DOCUMENTS

| | | | |
|---|---|---|---|
| 6,038,400 A | 3/2000 | Bell et al. | |
| 8,577,031 B2 | 11/2013 | Asperger et al. | |
| 2002/0136407 A1 | 9/2002 | Denning et al. | |
| 2003/0070083 A1* | 4/2003 | Nessler | G06F 21/575 |
| | | | 713/193 |
| 2003/0133574 A1 | 7/2003 | Caronni et al. | |
| 2006/0047972 A1 | 3/2006 | Morais | |
| 2006/0132331 A1* | 6/2006 | Kim | G06F 3/023 |
| | | | 341/26 |
| 2007/0140477 A1 | 6/2007 | Wise | |
| 2009/0213275 A1* | 8/2009 | Trager | H04N 5/44 |
| | | | 348/729 |
| 2010/0077214 A1 | 3/2010 | Jogand-Coulomb et al. | |

\* cited by examiner

SYSTEMS AND METHODS FOR MANAGING CRYPTOGRAPHIC KEYS IN A SECURE MICROCONTROLLER

CROSS REFERENCE TO RELATED APPLICATION

The present application is a divisional of and claims the priority benefit under 35 U.S.C. §120 to co-pending and commonly-assigned U.S. application Ser. No. 13/597,009, filed Aug. 28, 2012, listing inventors, Vincent Debout, Frank Lhermet, Yann Yves Rene Loisel, Gregory Romé, and Christophe Tremlet, and which claims priority to French Application No. 1158222, filed Sep. 15, 2011, and titled "Systems and Methods for Managing Cryptographic Keys in a Secure Microcontroller," the subject matter of which is hereby incorporated herein by reference.

BACKGROUND

A. Technical Field

The present invention relates generally to key management in a secure microcontroller, and more particularly, to systems, devices and methods of automatically and transparently employing logic or physical address based keys that may also be transferred using a dedicated secure link between a cryptographic processor and key sources.

B. Background of the Invention

A microcontroller is normally a single integrated circuit comprising a central processing unit (CPU) core, memory, and input/output (I/O) peripherals. A secure microcontroller is used for applications that involve trusted operations on valuable assets in a trusted environment where a thief or hacker may attempt to gain access to sensitive data through processor cores, memory devices or I/O peripherals that are used to communicate and process sensitive data. This sensitive data may include account numbers, access codes, financial transactions/balances, rights management, metering data (e.g., energy, units), program algorithms and other information. The secure microcontroller may use non-volatile RAM rather than ROM for storage, and additional enhanced security features are employed to avoid unauthorized accesses. To date, the secure microcontroller has been applied in a wide range of security-critical applications such as electronic banking, commercial transactions, and pay-TV access control, or any application that requires protection of sensitive assets.

Since the sensitive data may be stored in an external memory of the secure microcontroller, memory content confidentiality and integrity are two distinct characteristics that should be addressed against different threats. The first threat is associated with sensitive information disclosure where confidential data are revealed and weakness in a program is exposed. The second threat is associated with modification of application behavior which involves programs and data being modified in the external memory and results in a data integrity issue.

The secure microcontroller is designed to offer a high level of security to data stored in the memory. For instance, physical security may be established against probing by anti-tampering enclosure. However, this solution may be expensive and does not cover new attack methods based on fault injection from power supply glitch, light, synchronous or asynchronous laser, or radioactive particles. The security features may also comprise memory encryption where data and addresses stored in the memory are encrypted or decrypted during the data exchanging process. As a result, the physical security perimeter can be limited to the microcontroller while the memory and their communication buses can remain exposed physically.

Data integrity control is implemented for the programs and data stored in the memory to detect any willing or unwilling corruption between what was originally sent for storage and what is stored in the memory. Specific integrity check methods are used to generate integrity control data (i.e., a tag or signature) during a memory write operation, and validity of the stored data are verified by its consistency with the corresponding integrity control data during a memory read operation. Integrity control constitutes a sufficient protection against fault injection attacks, and sometimes, it is implemented in software and embedded in the secure microcontroller to ensure a sufficient level of trust to stakeholders.

The aforementioned data security and data integrity concerns may be addressed by incorporating a hardware engine for cryptographic operations (e.g., data encryption, data decryption and integrity check) at the interface of the microcontroller to the external memory rather than relying on software. The hardware engine allows faster reaction to fault attacks, enhanced performance for data encryption or decryption. Also this allows direct porting of standard operating systems to the secure microcontroller without major software modifications. One or several keys may be employed in any cryptographic operation. Although the methods implemented in the hardware engine may be public, these keys are kept confidential to avoid compromising data security or integrity. As a result, a need exists to manage cryptographic keys.

SUMMARY OF THE INVENTION

Various embodiments of the present invention relate to key management in a secure microcontroller, and more particularly, to systems, devices and methods of automatically and transparently employing logic or physical address based keys that may also be transferred using a dedicated secure link between a cryptographic processor and key sources.

One aspect of this invention is a secure microcontroller comprising a central processing unit (CPU) core, a plurality of key sources, a cryptographic processor and a universal memory controller. A data word and an associated logic address are generated by the CPU core. The cryptographic engine translates the logic address to at least one physical address, and processes the data word based on at least one target key that is selected from a plurality of keys according to the logic or physical address. The universal memory controller stores each processed data word in the corresponding physical address within a memory. Each key in the plurality of keys is associated with a memory region within the memory, and therefore, the logic or physical address associated with a memory region may be used to automatically identify the corresponding target key. A dedicated secure link may be used to transport key request commands (including a key ID) and the plurality of keys, and may be implemented as a serial data interface.

One aspect of the invention is a method of pairing cryptographic keys with memory addresses in a secure microcontroller. A data and a logic address are received. The logic address is translated to at least one physical address, the logic address or the physical address is compared to a plurality of area configuration sets. Each area configuration set is associated with a memory region storing data processed based on a particular key. Due to its consistency with the logic address or the physical address, an area configuration set is identified and further used to select a target key from a plurality of keys.

One aspect of the invention is a secure microcontroller that employs a dedicated secure link to couple key sources and a cryptographic processor. The cryptographic processor generates a key request command requesting a plurality of keys to transfer from the key sources, selects at least one target key from the plurality of keys, and may further process an input data based on the target key. The key request command is issued via the dedicated secure link from the cryptographic processor to the key sources, and similarly the plurality of keys are transported on an opposite direction via the dedicated secure link. This secure link may be implemented as a serial data interface, and is separated from the system bus such that other modules in the secure microcontroller are disabled from accessing the target key.

One aspect of the invention is a method of managing cryptographic keys using a dedicated secure link in a secure microcontroller. The dedicated secure link may be implemented as a serial data interface, including a serial output data, a first serial integrity data, a serial clock, a serial input data, and a second serial integrity data. The serial output data incorporates a key request command including a key identification (ID). Upon receiving and shifting the key request command, key sources may select a key from a plurality of keys for transporting and convert it to the serial input data. The first and second serial integrity data are associated with the serial output and input data, respectively. The command, the key for transporting, the integrity data and a synchronous clock are transported using the dedicated secure link.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 illustrates an exemplary block diagram of a secure microcontroller system comprising a secure microcontroller interfacing with an encrypted and integrity protected memory according to various embodiments of the invention.

DETAILED DESCRIPTION OF THE PREFERRED EMBODIMENTS

Figure 1:
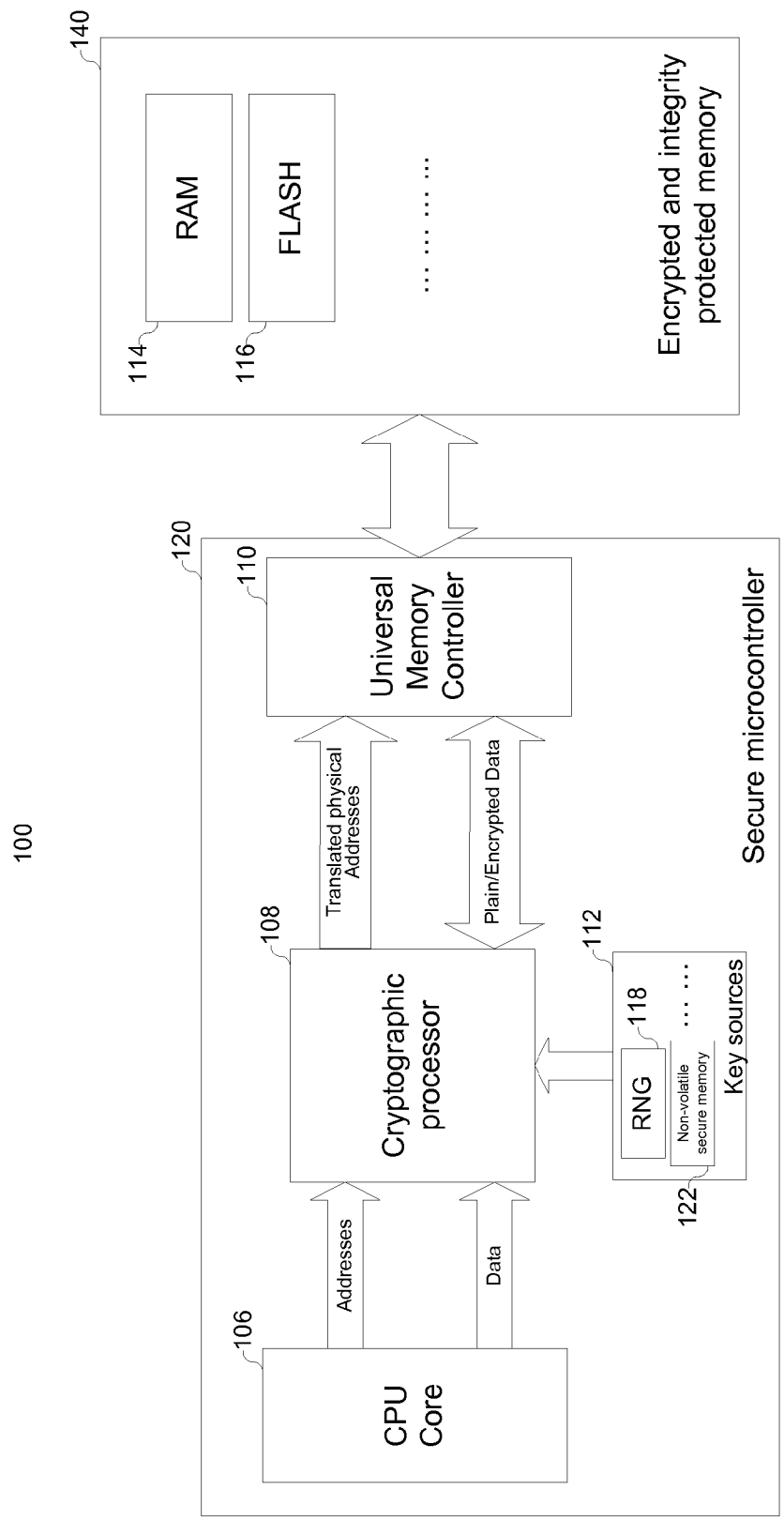

Embodiments of the present invention provide systems, devices and methods of key management in a secure microcontroller, and more particularly, to systems, devices and methods of automatically and transparently employing logic or physical address based keys that may be transferred using a dedicated secure link between a cryptographic processor and key sources in the secure microcontroller.

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

In terms of data security, it is a good practice to dedicate one specific key for each specific usage in a secure microcontroller. Encrypting the whole external memory with one single key may not be the preferred option. It is preferred to encrypt or protect different memory regions with different keys. Therefore, a plurality of cryptographic keys may be employed in the secure microcontroller, and each key is associated with a memory region in an encrypted and integrity protected memory. Once a physical address is identified within the memory region, the key associated with this memory region may be automatically identified to process corresponding input data. Memory content confidentiality is enhanced by such on-the-fly key identification based on the physical address.

A cryptographic operation may be data encryption, data decryption, data formatting, integrity computation or integrity check, and one or several cryptographic keys may be employed in any of these operations. In certain embodiments, plain data are stored in some memory regions involving no cryptographic operation, and thus, such plain memory regions are not associated with any cryptographic key.

The on-the-fly key identification process is implemented preferably in hardware, and is transparent to the external of the secure microcontroller. In order to capture correct information in a memory interfacing a secure microcontroller, attackers need to not only discern various memory regions but also identify cryptographic keys associated with the memory regions. As a result, the present invention allows higher level of data security than a conventional secure microcontroller, and is particularly useful where a high level of data security is needed.

FIG. 1 illustrates an exemplary block diagram 100 of a secure microcontroller system comprising a secure microcontroller 120 interfacing with an encrypted and integrity protected memory 140 according to various embodiments of the invention. The secure microcontroller 120 comprises a CPU core 106, a cryptographic processor 108, a universal memory controller 110, key sources 112 and buses for data, addresses and keys. The cryptographic processor 108 is coupled to the CPU core 106 and the key sources 112, and used to map the logic addresses, check data integrity, and encrypt/decrypt/format data. One or several keys are provided by the key sources 112 to the cryptographic processor 108 for a cryptographic operation, such as data encryption, decryption, formatting, integrity computation and integrity check. The universal memory controller 110 is coupled to the cryptographic processor 108, and enables access to the encrypted and integrity protected memory 140.

The encrypted and integrity protected memory 140 may comprise various external memories including random access memory (RAM) 114, flash memory 116, and read only memory (ROM). Generating data in different memories may impose different requirements on keys. For instance, a non volatile memory may need a key stored permanently in a secure area while a volatile memory is preferably associated with a key generated randomly at each boot.

A memory included in the memory 140 may be partitioned to a plurality of plain content regions and a plurality of encrypted content regions. Original or processed data may be stored in the plain or encrypted content regions, respectively. Original data may be directly stored in a plain content region of the memory 140, and no key is associated. The encrypted content regions are normally used to store programs or data associated with confidential information, e.g., user names, passwords, transactions, and etc. Such confidential information may be encrypted using different keys and stored in different encrypted content regions, and each encrypted content region is associated at least one key.

In various embodiments of the present invention, a key may be linked to a complete memory, a region within a memory or a segment straddling at least two memories included in the memory 140. Key sources 112 comprise a random number generator (RNG) 118 to generate random keys and a non-volatile secure memory 122 to store fixed keys. Keys provided by the key sources 112 are mapped to different memory regions within the encrypted and integrity protected memory 140, and used to process corresponding input data.

In certain embodiments, during a memory write cycle, the CPU core 106 provides data and a logic address to the cryptographic processor 108 which may further encrypt the data using a data encryption method. Integrity control data may be generated in the cryptographic processor 108 using an integrity check method based on the data. In addition to generating the encrypted data and integrity control data, the cryptographic processor 108 also translates the input logic addresses to two physical addresses, one for the encrypted data and the other for the integrity control data. The universal memory controller 110 identifies these two physical addresses in the memory 140 and stores the encrypted data and the integrity control data in the physical addresses.

In certain embodiments, during a memory read cycle, the logic address is provided by the CPU core 106 to extract specific encrypted data from the external encrypted and integrity protected memory 140. The cryptographic processor 108 translates the logic address to recover two physical addresses for the encrypted data and the associated integrity control data, respectively. The universal memory controller 110 enables the access to memory contents stored at these two physical addresses, and the cryptographic processor 108 is coupled to receive the encrypted data and the integrity control data from the memory 140. A data decryption method is implemented to decrypt the encrypted data. Data recovered from the encrypted data are processed using the integrity check method that is formerly used to generate the integrity control data. If the integrity control data regenerated from the recovered data are consistent with the integrity control data extracted from the memory 140, then the recovered data are valid and subsequently provided to the CPU core 106; otherwise, an error is acknowledged and a dedicated hardware is employed to raise a CPU exception based on the security policy of the microcontroller. In various embodiments of the present invention, the signal used to generate CPU exception or the CPU exception itself may be exploited to erase the sensitive data, trigger a non-maskable interruption, write a value in a flag register, reset the microcontroller, or run a dedicated code.

Processed data are stored in encrypted content regions in the memory 140, and at least one key is used for each aforementioned cryptographic operation/method (i.e., data encryption, data decryption, and integrity check). A same key is employed for encryption and decryption methods that are reverse to each other, since these two methods are associated with data at a same address in the memory. Once a logic address and associated physical address is associated with a particular memory region, the cryptographic keys may be identified according to the logic or physical address. In particular, a key identification (ID) may be associated with each key. Therefore, the secure microcontroller system 100 is based on this method of paring keys and physical addresses in different memory regions in the memory 140.

The physical addresses in a memory region may be described by a set of area configurations specifying an associated address range. In certain embodiments, the area configuration set may include a low address and a high address. The physical addresses in the memory region are within the range defined by the area configuration set. Therefore, upon generating a physical address for input data, the secure microcontroller may identify the memory region for storing processed data by comparing the physical address with available area configuration sets, and a target key paired with the memory region is subsequently applicable for processing the input data.

In various embodiment of the present invention, the RNG 118 and the non-volatile secure memory 122 are used to provide random and fixed keys to the cryptographic processor 108, respectively. These random and fixed keys may be directly provided by the RNG 118 or extracted from and the non-volatile secure memory 122. These keys wait to be transported to the processor 108 for use in data processing. Either the RNG 118 or the non-volatile secure memory 122 may provide a plurality of keys that are associated with various memory regions interfacing to the universal memory controller 110. In certain embodiments, the RNG 118 is used to generate a key to encrypt/decrypt data in the RAM 114, and the non-volatile secure memory 122 is used to provide a key to encrypt/decrypt data in the flash memory 116.

In one embodiment based on embedded software, data in a volatile memory MemA and data in a non-volatile memory MemB are encrypted with a first key KeyA and a second key KeyB, respectively. The cryptographic processor 108 has previously loaded data MemA using KeyA. Upon receiving a memory read request for the data in MemB, hardware caches in the cryptographic processor 108 may respond promptly to enable a memory access, and however, the embedded software may fail to enable a configuration change needed to load the second key KeyB timely. As a result, data in MemB are extracted using the erroneous key, KeyA, rather than KeyB, and in this instance, the embedded software fails to manage keys. A preferred solution to pair addresses and keys may be based on hardware units integrated in the secure microcontroller.

Figure 2:
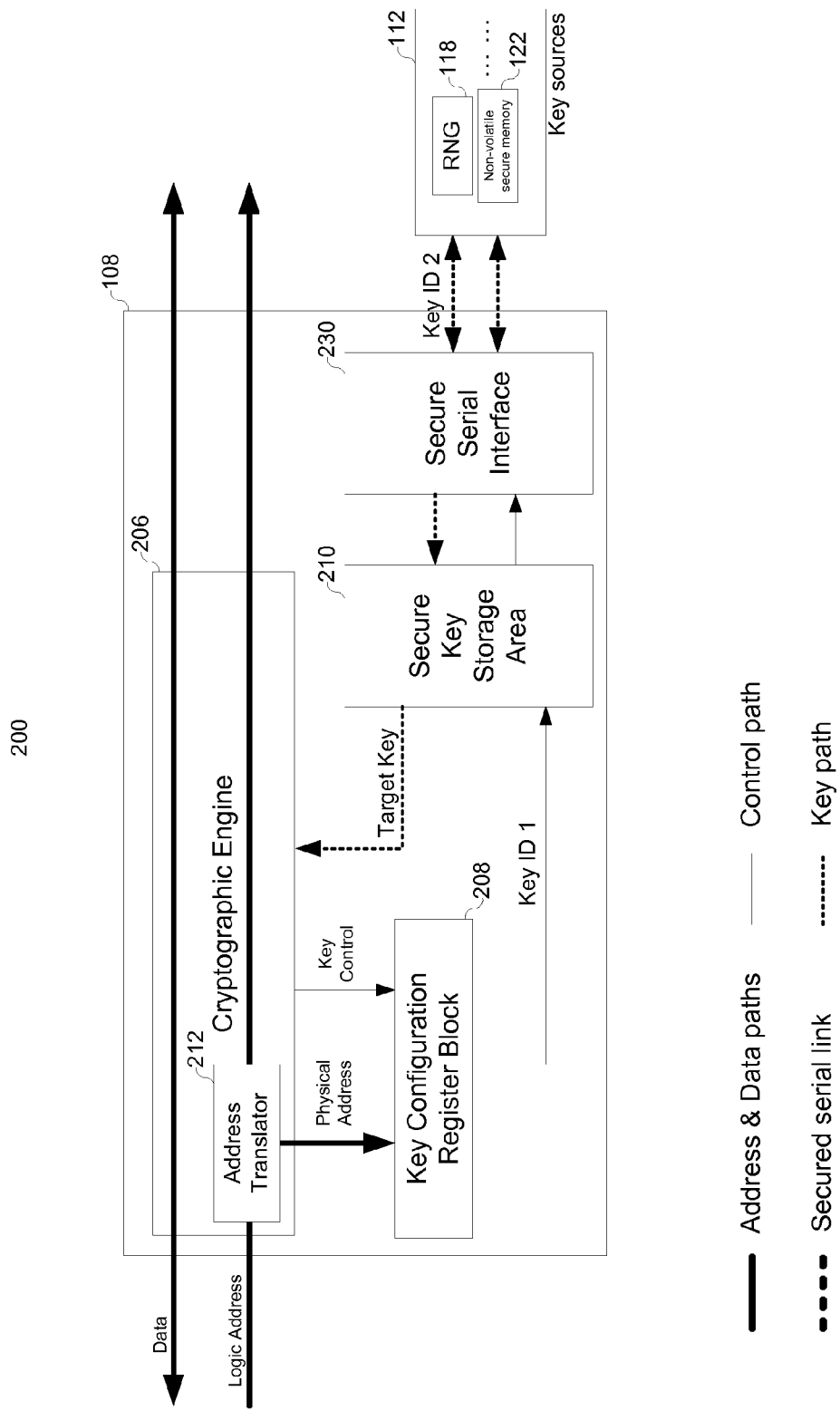
FIG. 2 illustrates an exemplary block diagram of a key pairing system in a secure microcontroller according to various embodiments of the invention.

A key pairing system may be integrated in the microcontroller 120, and applied as a hardware solution to manage a plurality of keys according to memory addresses. FIG. 2 illustrates an exemplary block diagram 200 of a key pairing system in a cryptographic processor 108 according to various embodiments in the invention. In such a key pairing system 200, the cryptographic processor 108 interfaces to one or several key sources 112, e.g., the RNG 118 and the non-volatile secure memory 122. The cryptographic processor 108 comprises a cryptographic engine 206, key configuration register block 208, a secure key storage area 210, and a secure serial interface 230. The cryptographic engine 206 further includes an address translator 212. The plurality of keys are provided by the key sources 112, and temporarily stored in secure key storage area 210. Key pairing is implemented in the key configuration register block 208 and the secure key storage area 210 according to a key identification (key ID 1).

The cryptographic engine 206 is placed in series within a data path that connects a universal memory controller to a CPU core. The cryptographic engine 206 receives data and an associated logic address. The data are processed using at least one data processing method while the logic address is translated to at least one physical address. During a memory write process, the data are processed (e.g., encrypted), and processed data are stored in at least one physical address of the memory 140. During a memory read process, the data are extracted from the at least one physical address in the memory 140 and processed (e.g., decrypted, integrity checked).

The physical address is paired with a cryptographic key (target key) by the key configuration register block 208 and the secure key storage area 210. The key configuration register block 208 is coupled to the cryptographic engine 206 and configured to generate a key ID 1. The key ID 1 identifies keys within the secure key storage area 210. The secure key storage area 210 is coupled not only to the key configuration register block 208 to receive the key ID 1, but also to the cryptographic engine 206 to return a target key.

The keys in the secure key storage area 210 are provided by the key sources 112 where keys are identified by a key ID 2. The secure serial interface 230 is coupled to both the secure key storage area 210 and key sources 112 including the RNG 118 and the non-volatile secure memory 122. The keys that may be provided by the key sources 112 are transported to the cryptographic processor 108 via this secure serial interface 230.

The key configuration register block 208 is configured to generate a key ID 1 based on a physical address. Each key ID 1 is associated with at least one key within the secure key storage area 210 according to a key map. The physical address is consistent with a particular area configuration set, and therefore, identified to locate within a corresponding memory region. Since the memory region is paired with at least one target key associated with a key ID, the physical address may be related to the key ID within the key configuration register block 208.

In certain embodiments, the key configuration register block 208 may be configured to generate the key ID 1 based on the logic address. Since a physical address is translated from a logic address in the cryptographic engine 206, a memory region in the memory 140 is also associated with a range of logic addresses. However, one logic address may be associated with more than one physical address when more than one data processing methods (e.g., encryption and integrity check) are involved. A key control signal is used if a logic address, rather than a physical address, is related to the key ID in the key configuration register block 208.

Figure 3A:
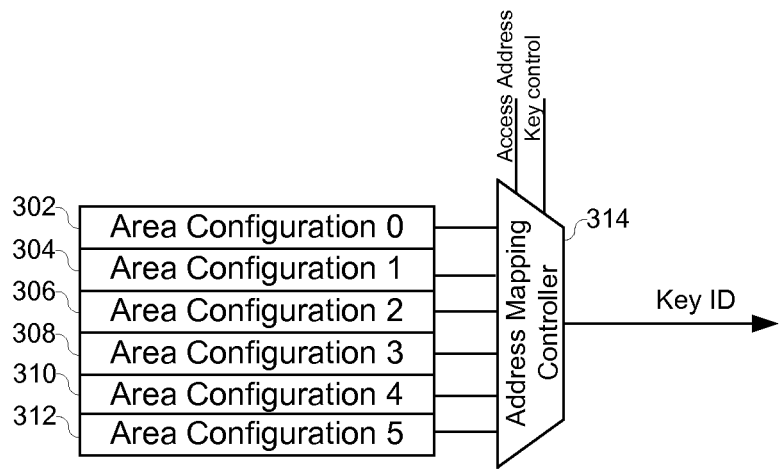
FIG. 3A illustrates an exemplary block diagram of a key configuration register block according to various embodiments in the invention.

FIG. 3A illustrates an exemplary block diagram of a key configuration register block 208 according to various embodiments in the invention. The key configuration register block 208 comprises a plurality of area configuration registers 302-312 and an address mapping controller 314. The registers 302-312 are used to store a plurality of area configuration sets associated with a plurality of memory regions. The address mapping controller 314 is coupled to receive an input address and a key control signal from the cryptographic engine 206. The controller 314 compares the input address with the plurality of area configuration sets, and generates a key ID associated with one of the area configuration sets corresponding to the memory region that is associated with the input address.

The input address may be a logic address or a physical address. The area configurations in the registers 302-312 are preferably represented in logic addresses or physical addresses in accordance with the format of the input address. In certain embodiments, a logic address is employed for the input address and the area configurations. The logic address is translated to two physical addresses in the cryptographic engine 206 for encrypted data and integrity check data, respectively. The encrypted data and integrity check data may be generated based on two distinct keys, respectively; and may be stored in two distinct memory regions or the same memory region. Since one logic address is employed for both data, the key control signal is needed to differentiate the encrypted data and the integrity control data, and area configuration sets may be selected accordingly. Compared with logic addresses, physical addresses are associated with the memory regions more directly, and the key control signal may not be used.

In one embodiment, the area configuration sets stored in the registers 302-312 specify the address ranges by setting high and low addresses for a plurality of memory regions. Comparators may be included in the address mapping controller 314, and the input address is consecutively compared with the high and low addresses in each register. If the input address falls between the high and low addresses in one register, the key ID associated with that register is outputted.

Figure 3B:
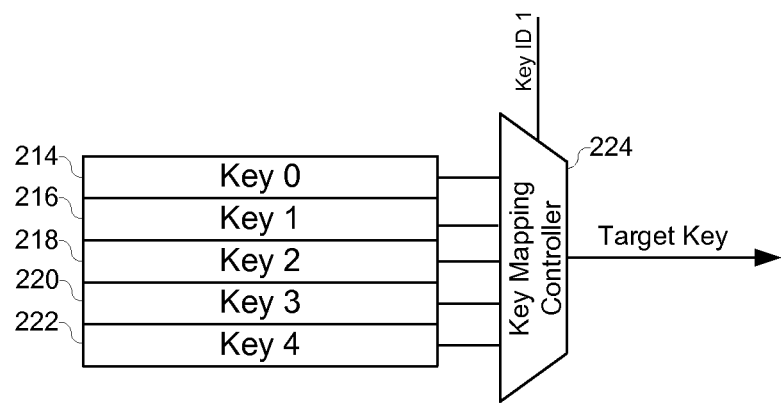
FIG. 3B illustrates an exemplary block diagram of a secure key storage area according to various embodiments in the invention.

FIG. 3B illustrates an exemplary block diagram 210 of a secure key storage area 210 according to various embodiments in the invention. The secure key storage area 210 selects the target key according to the key ID 1. The secure key storage area 210 comprises a plurality of key registers 214-222 and a key mapping controller 224. Each key register stores a key that may be provided by different key sources, such as RNG or non-volatile secure memory. The key ID 1 is directly mapped to the keys in the registers 214-222. In certain embodiments, the key mapping controller 224 is a multiplexer that is coupled to receive the key ID 1, and selects a target key from the keys in the registers 214-222 according to the key ID 1.

Figure 3C:
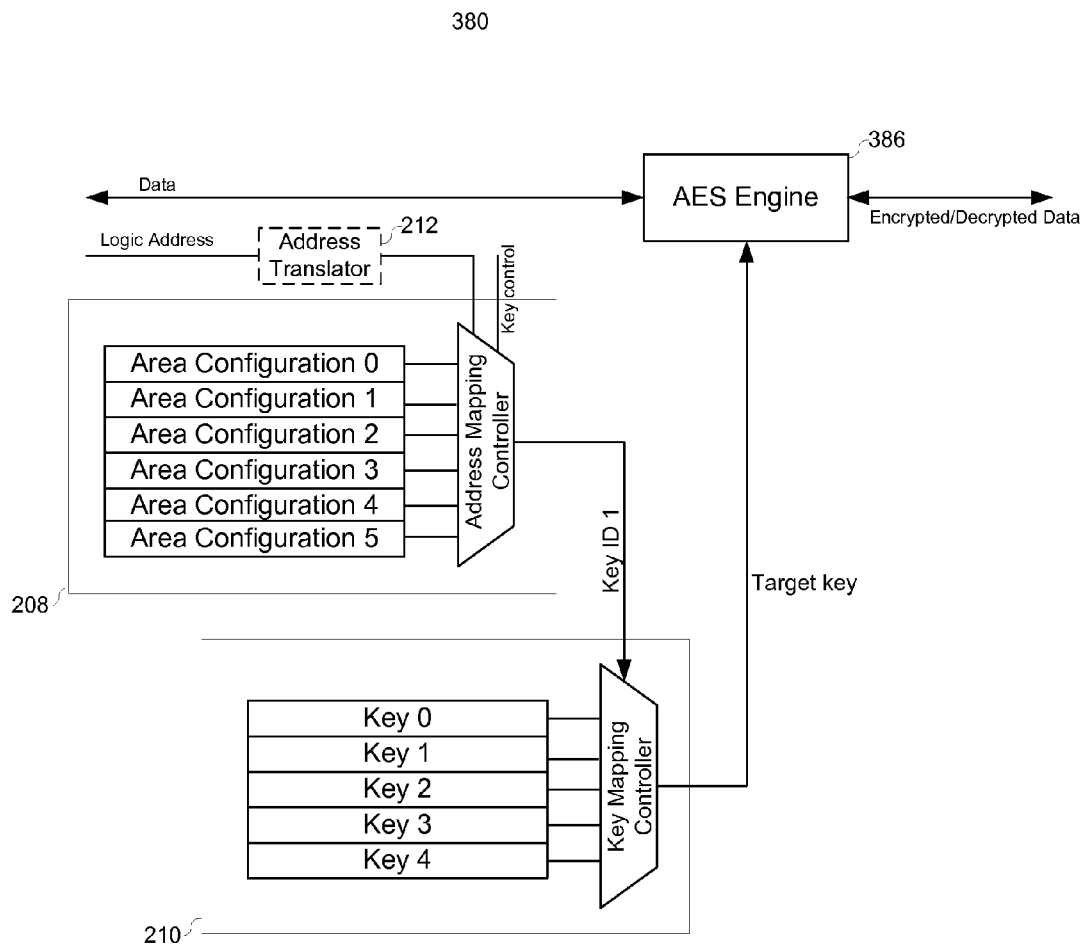
FIG. 3C illustrates another exemplary block diagram of a key pairing system in a secure microcontroller according to various embodiments in the invention.

FIG. 3C illustrates another exemplary block diagram 380 of a key pairing system interfacing to an Advanced Encryption Standard (AES) engine 386 in a secure microcontroller according to various embodiments in the invention. The key pairing system 380 comprises a key configuration register block 208 and a secure key storage area 210. The key configuration register block 208 is coupled to receive the logic address or a physical address, and the physical address is translated from the logic address by an address translator 212. A key ID 1 is generated by the key configuration register block 208, and provided to the secure key storage area 210 to select a target key from a plurality of keys that are stored in its key registers. The key size may be 128, 192 or 256 bits.

The AES engine 386 is coupled to receive input data and this target key. In one embodiment, the input data are original data in plain text provided by a CPU core. The input data are subsequently encrypted using the key in the AES engine 386 and stored in a certain memory region. In another embodiment, the input data are encrypted data extracted from a memory region, and may be decrypted to return original data in plain text using the same key in the AES engine 386.

Keys provided by various key sources are normally loaded to and stored in the cryptographic processor 108. As the microcontroller 120 starts up or resets, the keys in the key sources 112 are loaded to the secure key storage area 210 in the processor 108. Upon tamper detection, these keys may be instantly erased from the secure key storage area 210. Although key mapping and key erasing have further enhanced data security, key transfer between the key sources 112 and the cryptographic processor 108 is still a potential vulnerable link. In various embodiments, the secure serial interface 230 is incorporated at the interface between the key sources 112 and the cryptographic processor 108 to address this concern, and so is this integrated with key pairing in the cryptographic processor 108.

Figure 4:
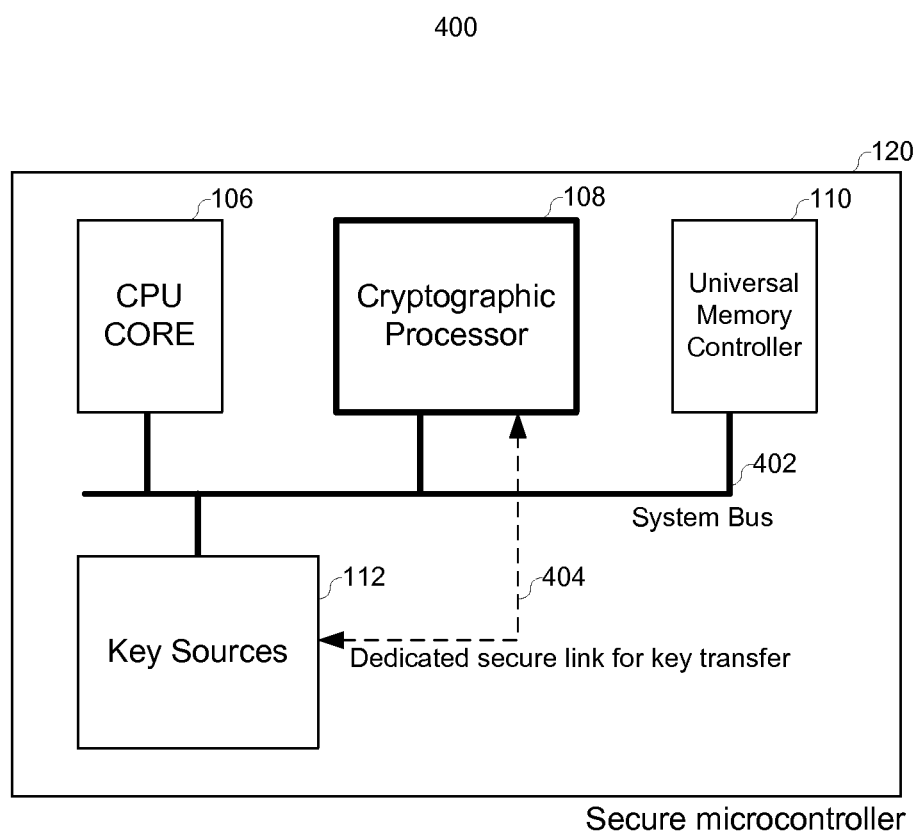
FIG. 4 illustrates a block diagram of a secure microcontroller including system level buses according to various embodiments of the invention.

FIG. 4 illustrates a block diagram 400 of a secure microcontroller including system level buses according to various embodiments of the invention. The secure microcontroller 400 comprises a plurality of function modules, including a CPU core 106, a cryptographic processor 108, a universal memory controller 110 and key sources 112. In a conventional microcontroller, these function modules are coupled by a system bus 402.

In one embodiment, upon receiving a key request command, the key sources 112 selects a key which is transported to the cryptographic processor 108 via the system bus 402. The key request command mainly carries a key ID 2 associated with the keys in the key sources 112. The CPU core 106 and the universal memory controller 110 may be in the path. Certain control units may also be included in the CPU core 106 and/or the universal memory controller 110 to copy or temporarily store the selected key. As a result, although the selected key may be intended for use in the cryptographic processor 108, it is accessible by a plurality of function modules and may even be stored in one register within these modules. Data security may be compromised due to exposure of the selected key to other function modules sharing the same system bus 402 with the cryptographic processor 108.

In order to minimize such key exposure, a dedicated secure link 404 may be applied to connect the cryptographic processor 108 directly with the key sources 112. In various embodiments of the invention, the key request command and selected key are transferred via the dedicated secure link 404 rather than the system bus 402. The key request command mainly carries a key ID 2 associated with the selected key. As a result, exposure of the key ID 2 and the key may be reduced, and overall system security is enhanced due to key transfer via this dedicated link 404.

Figure 5:
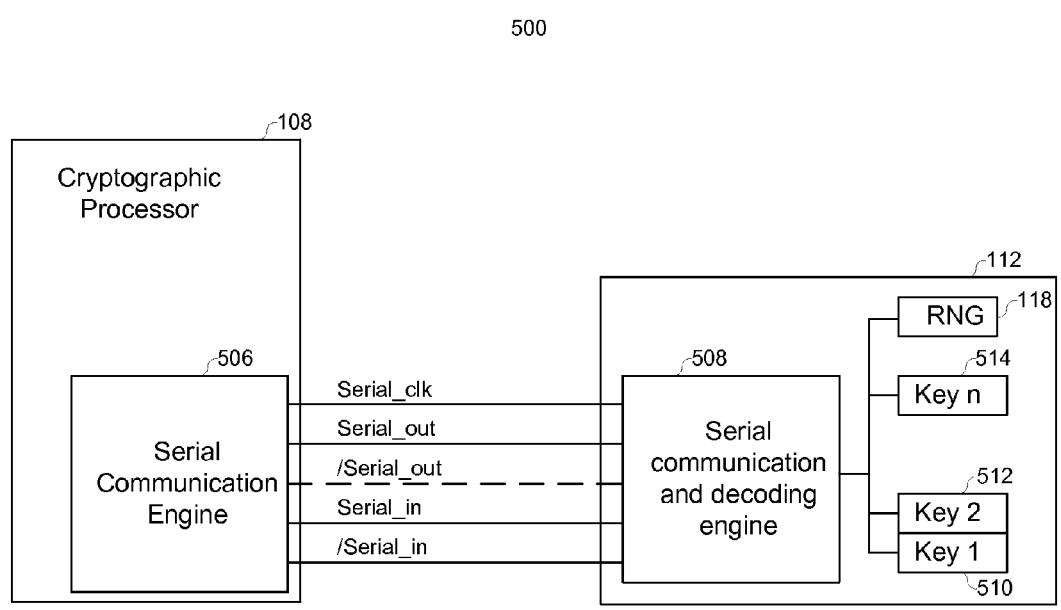
FIG. 5 illustrates a block diagram of a cryptographic engine communicating with a secure key storage area via a serial data interface according to various embodiments in the invention.

In certain embodiments, the dedicated secure link 404 for key transfer is a serial data interface between the cryptographic processor 108 and the key sources 112. The cryptographic processor 108 acts as a master fetching target keys from a slave, i.e., the key sources 112. FIG. 5 illustrates a block diagram 500 of a cryptographic processor 108 communicating with key sources 112 via a serial data interface according to various embodiments in the invention. In various embodiments of the present invention, this serial data interface is a dedicated secure link 404.

The serial data interface comprises five signals that are respectively a serial clock Serial_CLK, a serial input data Serial_in, a complementary serial input data /Serial_in, a serial output data Serial_out, and a complementary serial output data /Serial_out. The complementary serial input and output data are inverted from the serial input and output data, respectively. In this serial data interface, input and output are defined in respect to the cryptographic processor 108.

The serial output data is generated to deliver a key request command for fetching a selected key according to a key identification (ID 2) embedded in the command. The serial input data is used to return the selected key. In order to ensure key integrity, the complementary serial input data is transferred as an integrity control data back with the serial input data. Similarly, the complementary serial output data is used as an integrity control data for the serial output data, such that the key ID 2 is protected from tampering and transported correctly during the serial link exchange. The serial clock is synchronous to these serial signals, and used for serial-to-parallel or parallel-to serial data conversion.

On the master side, the cryptographic processor 108 includes a serial communication engine 506. The serial communication engine 506 is used to convert parallel control signals (including the key ID 2) associated with a key request command to the serial output data, provide the serial clock, receive the serial input data (i.e., the selected key) and the complementary serial input data, and verify the integrity of the serial input data. The parallel control signals are associated with the key request command, and include the key ID 2. In some embodiments, there might be several instances of the communication engine 506.

On the slave side, the key sources 112 include a corresponding serial communication and decoding engine 508 and key storage locations 510-514. Each of the key storage locations may be included in the non-volatile secure memory 122 or an additional memory resource that is used to store one key provided by a key source, e.g., the RNG 118 or the non-volatile secure memory 122. The engine 508 is used to implement a plurality of functions, including checking the integrity of the serial output data, converting the serial output data to the parallel control signals comprising the key ID 2, decoding the key ID 2, selecting the selected key from keys generated by the RNG 118 directly or the keys stored in the key storage locations 510-514, and converting the selected key to the serial input data and the complementary serial input data. A key selecting block is integrated in the serial communication and decoding engine 508.

In various embodiments, the keys stored in the key storage locations 510-514 and the key ID 2 are associated to various memory regions. Once the key ID 2 is identified in the secure key storage area 210, the key ID 2 is incorporated in the parallel control signals and the serial output data associated with the corresponding key request command. The parallel control signals may subsequently be converted to the serial output data by the serial communication engine 506.

In other embodiments, the serial communication engine 508 may interface directly with the Random Number Generator. Upon reception of a key request command the Serial communication and decoding engine may instruct the random number generator to issue a random number. Upon receiving the random number from the random number generator, the serial communication and decoding engine will send it back to the master communication engine 506.

Figure 6:
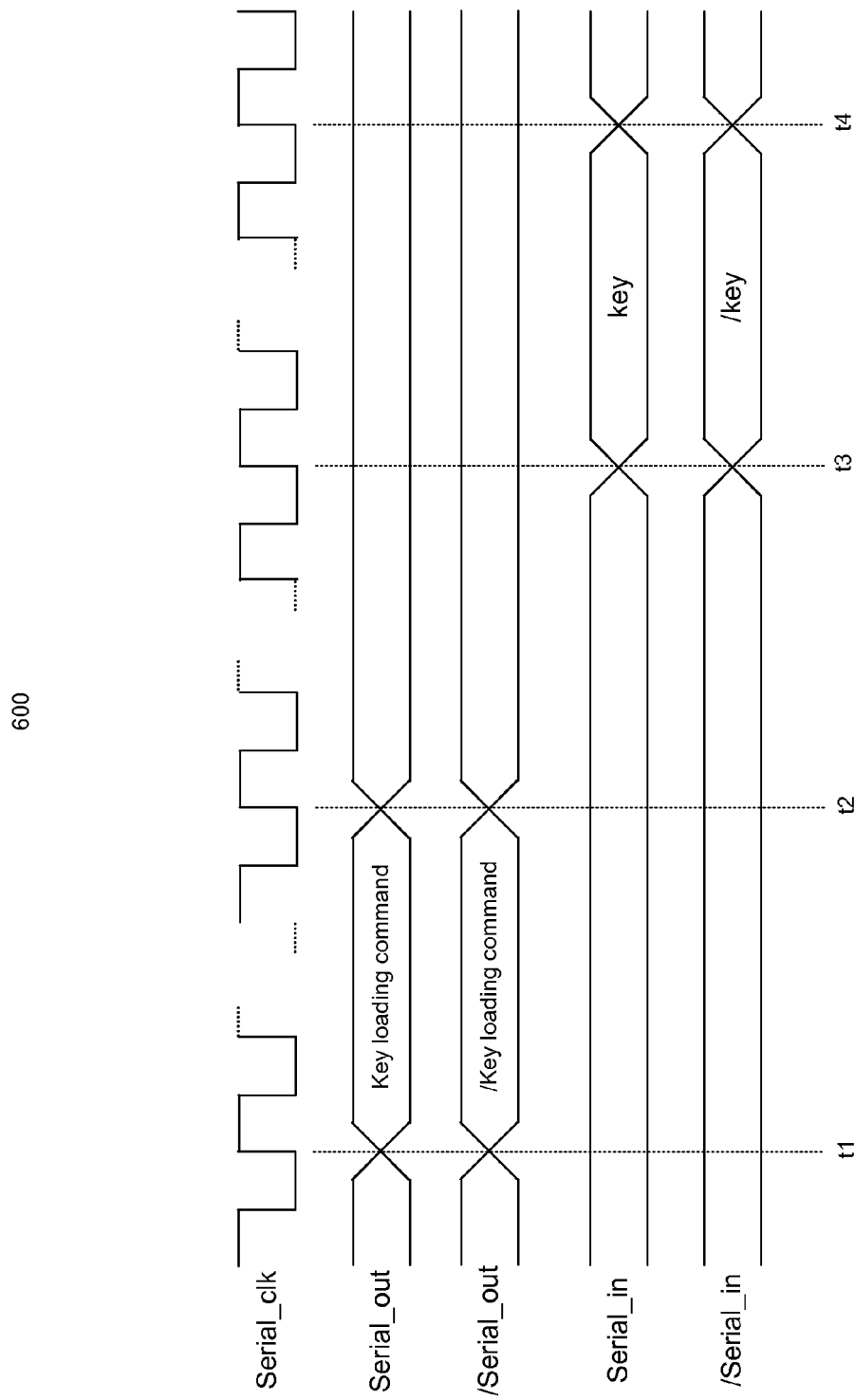
FIG. 6 illustrates a time diagram for four signals included in a dedicated secure link implemented in a serial data interface according to various embodiments in the invention.

FIG. 6 illustrates a time diagram 600 for five signals included in a serial data interface according to various embodiments in the invention. The five signals comprise a serial clock Serial_clk, a serial output signal Serial_out, a complementary serial output signal /Serial_out, a serial input signal Serial_in, and a complementary serial input signal /Serial_in. In various embodiments of the present invention, this serial data interface is a dedicated secure link.

The serial output data Serial_out is synchronized with the serial clock Serial_clk, and associated with a key request command in the serial communication engine 506 in the cryptographic processor 108. The serial output data Serial_out is delivered sequentially to the key sources 112 during consecutive clock cycles within a time period t1-t2. Integrity of the serial output data is first verified according to the complimentary output data /Serial_out delivered with Serial_out to the serial communication and decoding engine 508 inside the key sources 112. In some embodiments, once verified, this serial output data may be converted to parallel control signals by a first serial-in to parallel-out (SIPO) shifter register in the engine 508. Upon receiving the parallel control signals, the engine 508 continues to decode the key ID and identify the selected key during a time period t2-t3. The selected key is typically stored as parallel data in one of the key storage locations 510-514. In some embodiments, the selected key may be converted to a serial input data Serial_in by a first parallel-in to serial-out (PISO) shifter register. A complementary serial input data /Serial_in needs to be generated as well.

In the cryptographic processor 108, the serial output data Serial_out may be first generated from parallel control signals using a second PISO shifter register, and the serial input data Serial_in may be transferred and received from the key sources 112 during a time period t3-t4. The serial input data Serial_in is subsequently converted by a second SIPO shifter register in the serial communication engine 506 in the cryptographic processor 108. Therefore, the first SIPO and PISO shifter registers are integrated in the engine 508 in the key sources 112, and the second PSIO and SIPO shifter registers are integrated in the engine 506 in the cryptographic processor 108. In various embodiments of the invention, these shifter registers may be triggered at rising edges, falling edges, or both rising and falling edges of the serial clock.

The complementary serial input and output data are employed to avoid fault injection into selected keys or key ID during a key transfer process. Attackers may inject a fault to force the selected key to a weak value, e.g., all zeros and all ones or to change a key ID. To further increase data security for key transfer, the serial secure link may transfer the complementary serial input and output data with the serial input and output data via their respective data lines. When one data is high, the other should be low. Since they carry complementary signals, these two data lines deliver different logic levels during a clock cycle. Therefore, once identical logic levels are detected on these two data lines, a security attack may occur, and ongoing data processing shall be terminated. In accordance, the keys stored in the secure key storage area 210 and in the key source with the exception of the RNG are preferred to be erased.

One skilled in the art will recognize that using a complementary serial input and output data is one exemplary method to ensure data integrity. Alternative data integrity methods may be used to generate serial integrity data based on the serial input and output data, and the data line for the complementary serial input and output data may be used to transfer these serial integrity data. Integrity control data may be recovered from such serial integrity data in the cryptographic processor for integrity check.

Figures 7A, 7B:
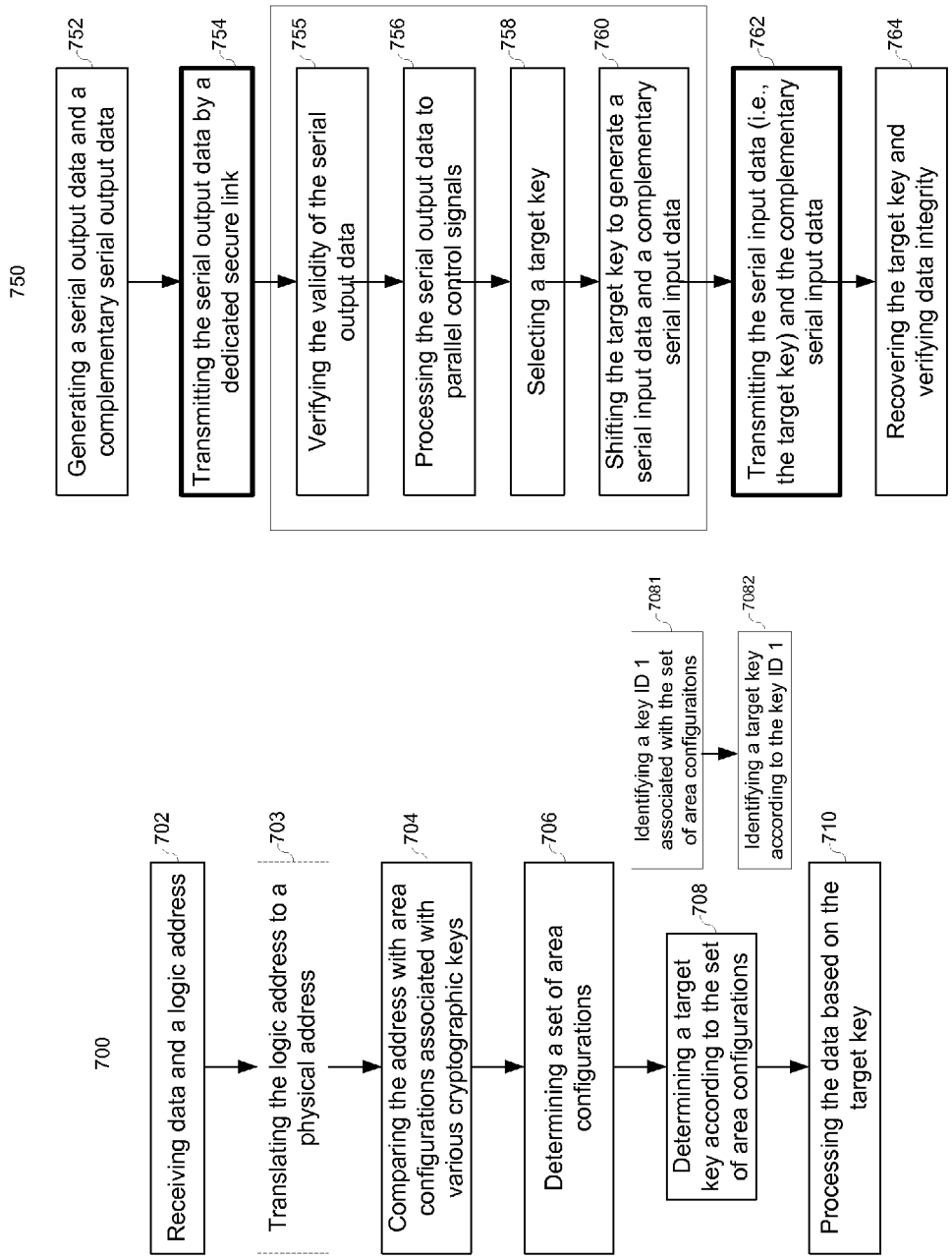
FIG. 7A illustrates a method of processing data using an address-based key in a secure microcontroller according to various embodiments in the invention.
FIG. 7B illustrates a method of loading a key for data processing using a serial data interface in a secure microcontroller according to various embodiments in the invention.

FIG. 7A illustrates a method 700 of processing data using an address-based key in a secure microcontroller according to various embodiments in the invention. Data and a corresponding logic address are received at step 702, and the logic address is translated to at least one physical address at step 703. The physical address is directly compared with a plurality of area configuration sets associated with a plurality of cryptographic keys at step 704. Each area configuration set is associated with a memory region used to store processed data generated using one of the cryptographic keys. The physical address may be identified as locating in an address range defined by area configurations in an area configuration set at step 706. Since a key is associated with the area configuration set and an associated memory region, a target key is identified at step 708. In certain embodiments, the area configuration set is first associated with a key ID 1 at step 7081, and the key ID 1 is subsequently associated with a target key at step 7082. The data are encrypted using the target key, and encrypted data are stored in the physical address at step 710.

In certain embodiment, the logic address is directly used in step 704 except that the area configurations are expressed in logic addresses rather than physical addresses. However, in certain embodiments, since one logic address may result in at least two physical addresses from two data processing methods, a key control signal may be used to limit the memory regions storing processed data.

FIG. 7B illustrates a method 750 of loading a key from key sources using a serial data interface according to various embodiments in the invention. In order to load a key according to a key ID 2, a serial output data and a complimentary serial output data are generated in a cryptographic processor at step 752 from a key request command that comprises parallel control signals. The serial output data are converted to parallel control signals including the key ID 2 at step 756. The selected key is selected according to the key ID 2 at step 758, and shifted to a serial input data and a complementary input data at step 760. Two serial input data are returned to the cryptographic processor, and used to recover the selected key and verify data integrity at step 764. Steps 756-760 are implemented in key sources that are external to the cryptographic processor.

In some embodiments, a dedicated secure link is used to transfer keys and requests for keys. Step 754 is implemented between steps 752 and 756 to transmit the serial output data (i.e., a serial key request command) and a clock from the cryptographic processor to the key sources by the dedicated secure link. The integrity of the serial output data may be confirmed according to the complimentary serial output data in the key sources at step 755. Likewise, step 762 is implemented between steps 760 and 764 to transfer the serial input data (i.e. a selected key in serial data format) and the complementary serial input data back to the cryptographic processor by the dedicated secure link. Steps 755-762 are implemented in key sources that are external to the cryptographic processor In various embodiments of the present invention, keys may be temporarily or permanently stored in both the secure key storage area 210 in the cryptographic processor 108 and the key sources 112 external to the processor 108. The key identification (ID) 1 and 2 are used to identify the key in these two storages.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method of pairing cryptographic keys with memory regions in a secure microcontroller:
   receiving a data and a logic address;
   translating the logic address to at least one physical address;
   comparing an address with a plurality of area configuration sets, the address being selected from the physical address and the logic address, each area configuration set being associated with a memory region storing data processed based on a particular key;
   identifying an area configuration set based on the address selected from the physical address and the logic address;
   receiving a plurality of keys via a dedicated link, the dedicated link being implemented as a serial data interface;
   selecting a target key from the plurality of keys according to the area configuration set; and
   processing the data based on the target key, wherein an address range of the memory region is defined by a plurality of area configurations included in the area configuration set.

2. The method of claim 1, wherein the memory region used for storing data is selected from a group consisting of random access memory, flash memory, non-volatile memory, and read only memory.

3. The method of claim 1, wherein the memory region is one selected from a group comprising a complete memory, a region within a memory or a segment straddling at least two memories.

4. The method of claim 1, wherein the plurality of keys are provided by a plurality of key sources including a random number generator.

5. The method of claim 1, wherein the plurality of keys are provided by a plurality key sources including a random number generator and a non-volatile secure memory.

6. The method of claim 1, wherein the step of processing the data based on the target key is selected from a group comprising data encryption, data decryption, integrity check, and data formatting.

7. The method of claim 1, wherein the step of processing the data based on the target key is implemented in an advanced encryption standard engine and, wherein the size of the target key is selected from a group consisting of 128 bits, 192 bits and 256 bits.

8. The method of claim 1, wherein the step of selecting a target key from a plurality of keys according to the area configuration set further comprises:
   identifying a key ID 1 associated with the area configuration set; and
   selecting the target key from the plurality of keys according to the key ID 1.

9. The method of claim 1, wherein each area configuration set includes a low address and a high address that indicate the address range of the corresponding memory region.

10. The method of claim 1, wherein the dedicated link is communicatively separate from a system bus.

11. The method of claim 5, further comprising, prior to receiving the plurality of keys:
   sending a key request through the dedicated link to the plurality of key sources.

12. The method of claim 11, wherein the key request is sent via the dedicated link as serial data and complementary serial data and the complementary serial data is used as an integrity control data.

13. The method of claim 12, wherein the key request is converted from a parallel data into the serial data before being sent via the dedicated link.

14. The method of claim 1, wherein each of the plurality of keys is sent via the dedicated link as serial data and complementary serial data and the complementary serial data is used as an integrity control data.

15. The method of claim 14, wherein each of the plurality of keys is converted from a parallel data into the serial data before being sent via the dedicated link.

16. The method of claim 1, wherein a serial clock signal is communicated via the dedicated link.

* * * * *